US007065647B2

(12) United States Patent
Funahashi

(10) Patent No.: US 7,065,647 B2
(45) Date of Patent: Jun. 20, 2006

(54) COMMUNICATION SYSTEM, AUTHENTICATION COMMUNICATION DEVICE, CONTROL APPARATUS, AND COMMUNICATION METHOD

(75) Inventor: Takeshi Funahashi, Saitama (JP)

(73) Assignee: Sony Corporation, Tokyo (JP)

( * ) Notice: Subject to any disclaimer, the term of this patent is extended or adjusted under 35 U.S.C. 154(b) by 757 days.

(21) Appl. No.: 10/185,483

(22) Filed: Jun. 26, 2002

(65) Prior Publication Data

US 2003/0014649 A1 Jan. 16, 2003

(30) Foreign Application Priority Data

Jun. 28, 2001 (JP) ............................ 2001-196804

(51) Int. Cl.
*H04L 9/00* (2006.01)
*G06F 17/30* (2006.01)

(52) U.S. Cl. ...................... 713/168; 713/169; 713/171; 380/283; 380/285

(58) Field of Classification Search ................ 713/168, 713/186, 155, 164, 171, 169; 380/283, 285
See application file for complete search history.

(56) References Cited

U.S. PATENT DOCUMENTS 4,993,068 A * 2/1991 Piosenka et al. ............ 713/186
6,484,260 B1 * 11/2002 Scott et al. ................. 713/186
6,741,729 B1 * 5/2004 Bjorn et al. ................ 713/182
2002/0095588 A1 * 7/2002 Shigematsu et al. ........ 713/186

* cited by examiner

*Primary Examiner*—Matthew Smithers
*Assistant Examiner*—Courtney Fields
(74) *Attorney, Agent, or Firm*—Frommer Lawrence & Haug LLP; William S. Frommer

(57) ABSTRACT

The present invention relates to a communication system including: authentication communication means of a portable type for performing authentication processing on the basis of human body characteristics of a user and outputting a predetermined authentication signal to an exterior thereof only when a positive result is obtained; and control means disposed separately from the authentication communication means for receiving the authentication signal outputted from the authentication communication means and performing predetermined control processing on the basis of the authentication signal.

5 Claims, 13 Drawing Sheets

COMMUNICATION SYSTEM, AUTHENTICATION COMMUNICATION DEVICE, CONTROL APPARATUS, AND COMMUNICATION METHOD

BACKGROUND OF THE INVENTION

The present invention relates to a communication system, an authentication communication device, a control apparatus, and a communication method, and is suitable for application to an electronic locking system of a non-contact type including a fingerprint identification unit, for example.

In most related-art systems for locking and unlocking a door of a building, a door of a vehicle or the like, the locking and unlocking is performed by inserting a metallic key into a metallic lock. However, in order to solve problems such as theft of a key, production of a duplicate key, so-called lock picking and the like, electronic locks using IC cards, input of personal identification numbers and the like have recently been spread.

However, a locking and unlocking system using such an electronic lock has a problem in that personal authentication of an owner of the key is not made because anyone can lock and unlock the door or the like as long as insertion of an IC card or input of a personal identification number is performed correctly.

In order to solve such a problem, locking and unlocking systems have been commercialized and realized which use an installation including a fingerprint identification unit as part of a lock in a door or the like so as to allow locking and unlocking only when a fingerprint matches the fingerprint of a preregistered valid user himself/herself.

However, since the fingerprint identification unit needs to be installed separately in each door or the like, it is difficult to spread the fingerprint identification unit, for example because a very large number of fingerprint identification units are required in facilities. In addition, there is a trouble of reconstructing the door or the like so that the door or the like has a structure adjusted according to an installing position of the fingerprint identification unit. Thus, the fingerprint identification unit still has a disadvantage in terms of practical use.

On the other hand, when the fingerprint identification unit is actually installed in the door or the like, an unrelated third party may play with the fingerprint identification unit to cause a breakage, a failure or the like of the fingerprint identification unit, and in practice, it is extremely difficult from a viewpoint of facility management to monitor all installation points at all times. In addition, when the fingerprint identification unit is exposed to the air, the fingerprint identification unit may become dirty with dust, rain and the like and break down. Thus, there is a trouble of attaching a special member for protecting the fingerprint identification unit from dust, water and the like.

SUMMARY OF THE INVENTION

The present invention has been made in view of the above problems, and it is an object of the present invention to propose a communication system, an authentication communication device, a control apparatus, and a communication method that are usable and simple in composition.

In order to solve the above problems, according to a first aspect of the present invention, there is provided a communication system including: an authentication communication device of a portable type for performing authentication processing on the basis of human body characteristics of a user and outputting a predetermined authentication signal to an exterior thereof only when a positive result is obtained; and a control apparatus disposed separately from the authentication communication device for receiving the authentication signal outputted from the authentication communication device and performing predetermined control processing on the basis of the authentication signal.

Consequently, with this communication system, on the basis of a result of authentication by the authentication communication device, only a user preregistered in the control apparatus makes it possible to perform the predetermined control processing.

Also, since the control apparatus and the authentication communication device are provided separately from each other, the familiar authentication communication device can be used for any facilities, thus saving the user a trouble of obtaining a means for access to each facility. Also, human body characteristics do not need to be stored in the control apparatus that is installed in each facility and can be used in a public place, and the human body characteristics are stored in the authentication communication device physically isolated from the control apparatus. Therefore, safety against leakage of human body characteristics is dramatically improved.

In addition, each control apparatus does not need to be provided with an expensive sensor, a device for storing human body characteristics, the authentication communication device and the like. Moreover, since the control apparatus and the authentication communication device communicate with each other at a short distance, a danger of interception by another device is reduced, which further improves safety.

In addition, according to a second aspect of the present invention, there is provided an authentication communication device of a portable type including: authentication means for performing authentication processing on the basis of human body characteristics of a user; and output means for outputting a predetermined authentication signal to an exterior thereof only when a positive result is obtained from the authentication means.

Consequently, with the authentication communication device, on the basis of a result of the user authentication, only a preregistered user makes it possible for an apparatus that the authentication communication device communicates with to perform predetermined control processing.

Furthermore, according to a third aspect of the present invention, there is provided a control apparatus for communicating at a short distance with an authentication communication device for outputting an authentication signal on the basis of human body characteristics, the control apparatus including: receiving means for receiving the authentication signal from the authentication communication device; communication device authenticating means for performing communication device authenticating processing for authenticating the authentication communication device; and processing means for performing predetermined processing when a positive result is obtained from the communication device authenticating means.

Consequently, with this control apparatus, on the basis of a result of authentication by the authentication communication device, only a preregistered user makes it possible to perform the predetermined control processing.

Furthermore, according to a fourth aspect of the present invention, there is provided a communication method including: performing authentication processing on the basis of human body characteristics of a user; and then outputting a predetermined authentication signal to an exterior only when a positive result is obtained.

Consequently, with this communication method, on the basis of a result of the user authentication, only a preregistered user makes it possible for an apparatus that the communication is made with to perform predetermined control processing.

DETAILED DESCRIPTION OF THE PREFERRED EMBODIMENTS

Preferred embodiments of the present invention will hereinafter be described in detail with reference to the drawings.

Figure 1:
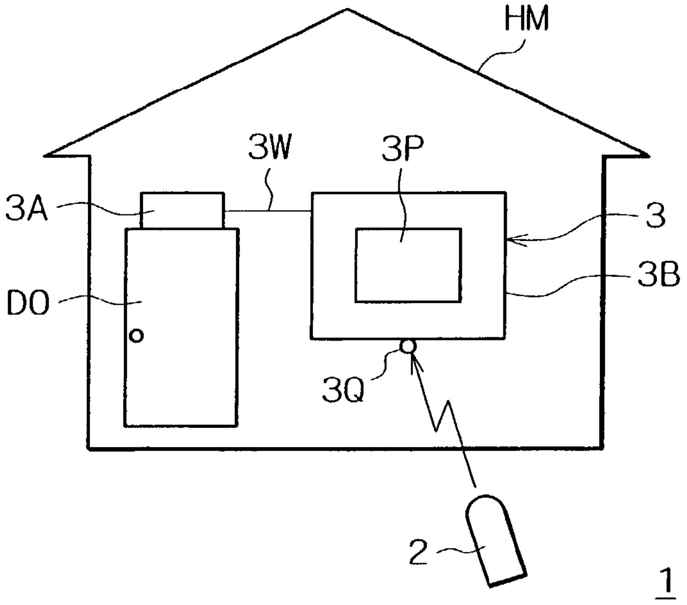
FIG. 1 is a schematic diagram showing configuration of an authentication system according to an embodiment.

[1] FIRST EMBODIMENT (1) Configuration of Authentication System According to First Embodiment In FIG. 1, a reference numeral 1 denotes an authentication system as a whole according to the first embodiment. The authentication system comprises: a portable electronic key 2 including a fingerprint identification unit (FIU) for identifying a fingerprint; and a key control apparatus 3 for receiving a signal supplied from the electronic key 2 and driving a given actuator 3A.

Figure 2:
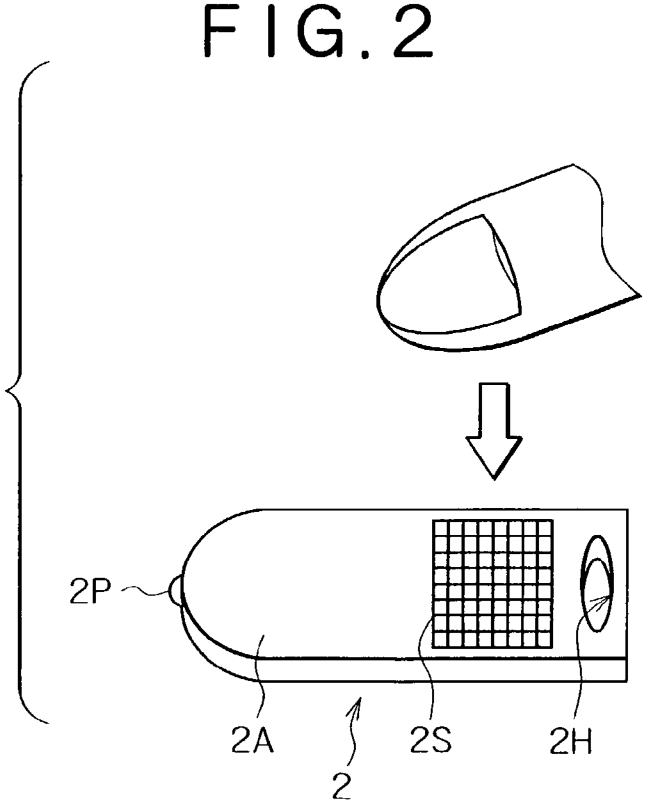
FIG. 2 is a schematic diagram showing external configuration of an electronic key shown in FIG. 1.

As shown in FIG. 2, the electronic key 2 has: a main body 2A in an overall shape of a board; an antenna terminal 2P formed at a central portion of a half disk-shaped tip of the electronic key 2; a hole 2H for a holder made at a predetermined position of a rear end of the electronic key 2; and a sensor for fingerprint identification (hereinafter referred to as a fingerprint identification sensor) 2S formed exposed at a center of a side surface.

As shown in FIG. 1, the key control apparatus 3 has a main body 3B attached to an outer wall side at an entrance of a house HM, for example. The main body 3B is provided with a control switching panel 3P for a user to perform various input operations and an antenna terminal 3Q. The main body 3B is connected to the actuator 3A for shutting and opening an electronic lock (not shown) attached to a door DO at the entrance via a wiring 3W extending from the main body 3B.

Figure 3:
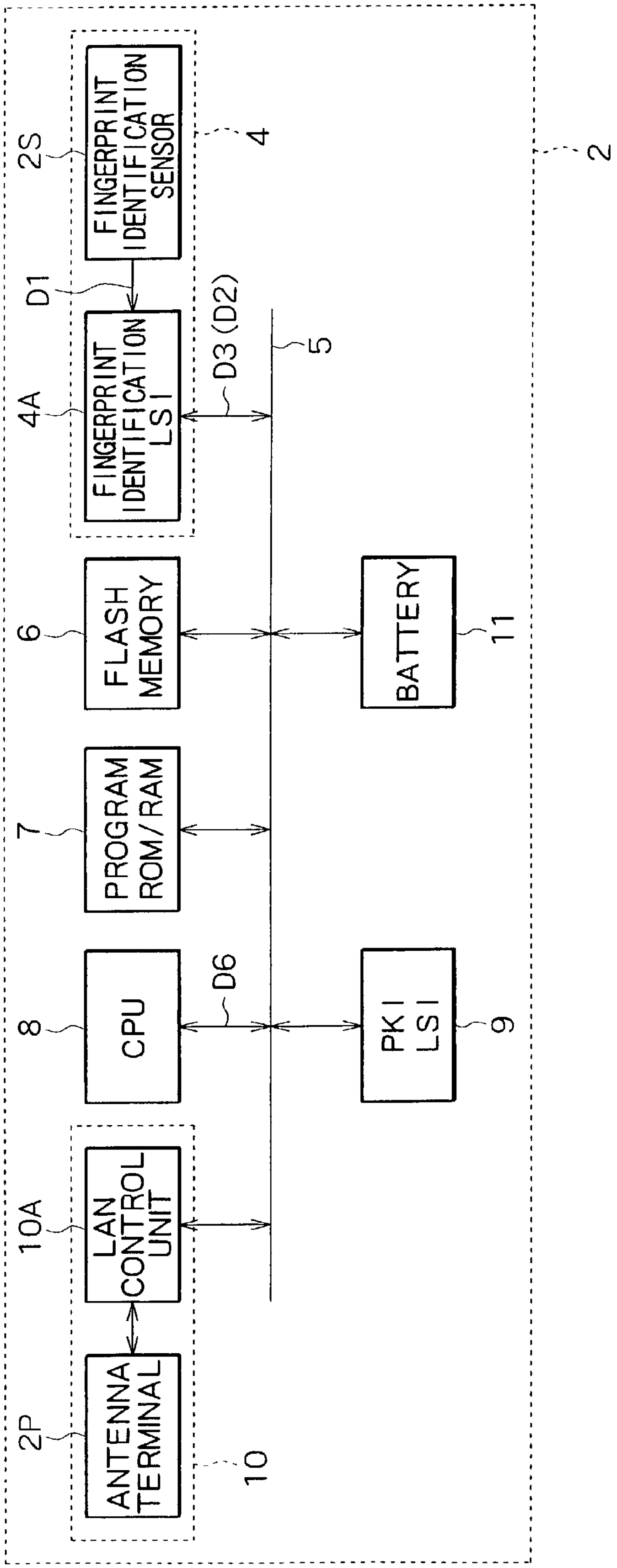
FIG. 3 is a block diagram showing details of configuration of the electronic key shown in FIG. 2.

FIG. 3 shows an internal configuration of the electronic key 2. The electronic key 2 includes: a fingerprint identification unit (FIU) 4; a flash memory 6 connected to the fingerprint identification unit 4 via a bus 5; a ROM (Read Only Memory) and RAM (Random Access Memory) 7 for programs; a CPU (Central Processing Unit) 8; a PKI (Public-Key Infrastructure) LSI (Large Scale Integration) 9 connected to the CPU 8 via the bus 5; and a transmitting and receiving unit 10. The electronic key 2 also includes a battery 11 formed by a button battery, for example, as a driving source.

The fingerprint identification unit 4 includes: a fingerprint identification sensor 2S for detecting a fingerprint of a finger of a human; and a fingerprint identification LSI 4A for processing a result of the detection obtained from the fingerprint identification sensor 2S.

The fingerprint identification sensor 2S is formed by a semiconductor sensor (so-called silicon sensor) in which predetermined numbers of semiconductors of an extremely small size are arranged in a vertical and a horizontal direction, respectively (for example 192 semiconductors in the vertical direction and 128 semiconductors in the horizontal direction) in a matrix manner with a predetermined pitch (for example 80 [μm]). When a finger is pressed into contact with the surface of the sensor, capacitance of semiconductors corresponding to the finger changes according to irregularities of a fingerprint of the finger, whereby the fingerprint as a whole is obtained.

Thus, the fingerprint identification sensor 2S detects the capacitance of a plurality of semiconductors situated within a predetermined detection area in the center of the semiconductor sensor, and then sends the capacitance as detection data D1 to the fingerprint identification LSI 4A.

The fingerprint identification LSI 4A converts a state of change of the capacitance of the semiconductors into a gray image on the basis of the detection data D1 obtained from the fingerprint identification sensor 2S, and then converts the gray image into binarized data D2 corresponding to the irregularities of the fingerprint (hereinafter referred to as fingerprint data).

Next, while using the program ROM and RAM 7 as a work memory, the fingerprint identification LSI 4A extracts a part (hereinafter referred to as template data) D3 corresponding to a characteristic point (hereinafter referred to as a template) of the fingerprint from the fingerprint data D2 and then stores the part in the flash memory 6, or compares the fingerprint data D2 with each piece of template data D3 prerecorded in the flash memory 6.

Figure 4:
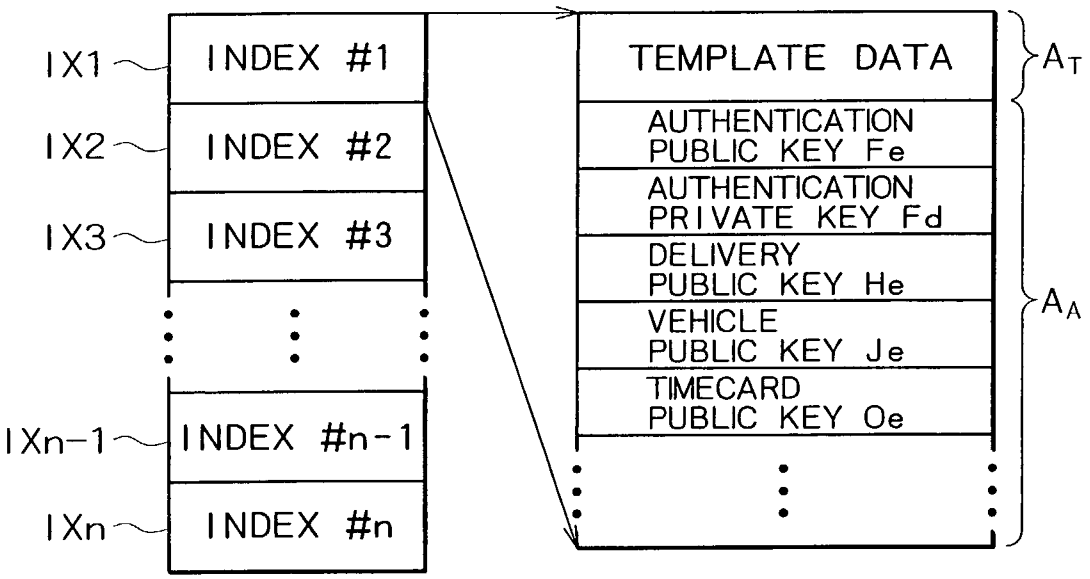
FIG. 4 is a conceptual diagram of assistance in explaining a data format of a flash memory of the electronic key.

FIG. 4 shows a data format of the flash memory 6. As shown in FIG. 4, each of indexes IX1 to IXn is provided for one fingerprint in the flash memory 6. Each of the indexes IX1 to IXn is divided into two areas: a template area $A_T$ and an attribute area $A_A$. The registered template data D3 is stored in the template area $A_T$, and various data associated with the template data D3 (various public and private keys and the like to be described later) is stored in the attribute area $A_A$.

In response to data input from the fingerprint identification LSI 4A, the CPU 8 reads a corresponding program of various programs stored within the flash memory 6, expands the program in the program ROM and RAM 7, and then performs various control processing according to the program.

Also, in response to data input from the fingerprint identification LSI 4A, the CPU 8 generates various cryptographic keys according to a cryptographic engine (program) stored in the flash memory 6 when necessary, as described later.

The transmitting and receiving unit 10 includes: a LAN control unit 10A for exchanging various data by a wireless LAN method such for example as Bluetooth; and the antenna terminal 2P for transmitting and receiving data sent to the LAN control unit 10A via the bus 5 under control of the CPU 8.

Figure 5:
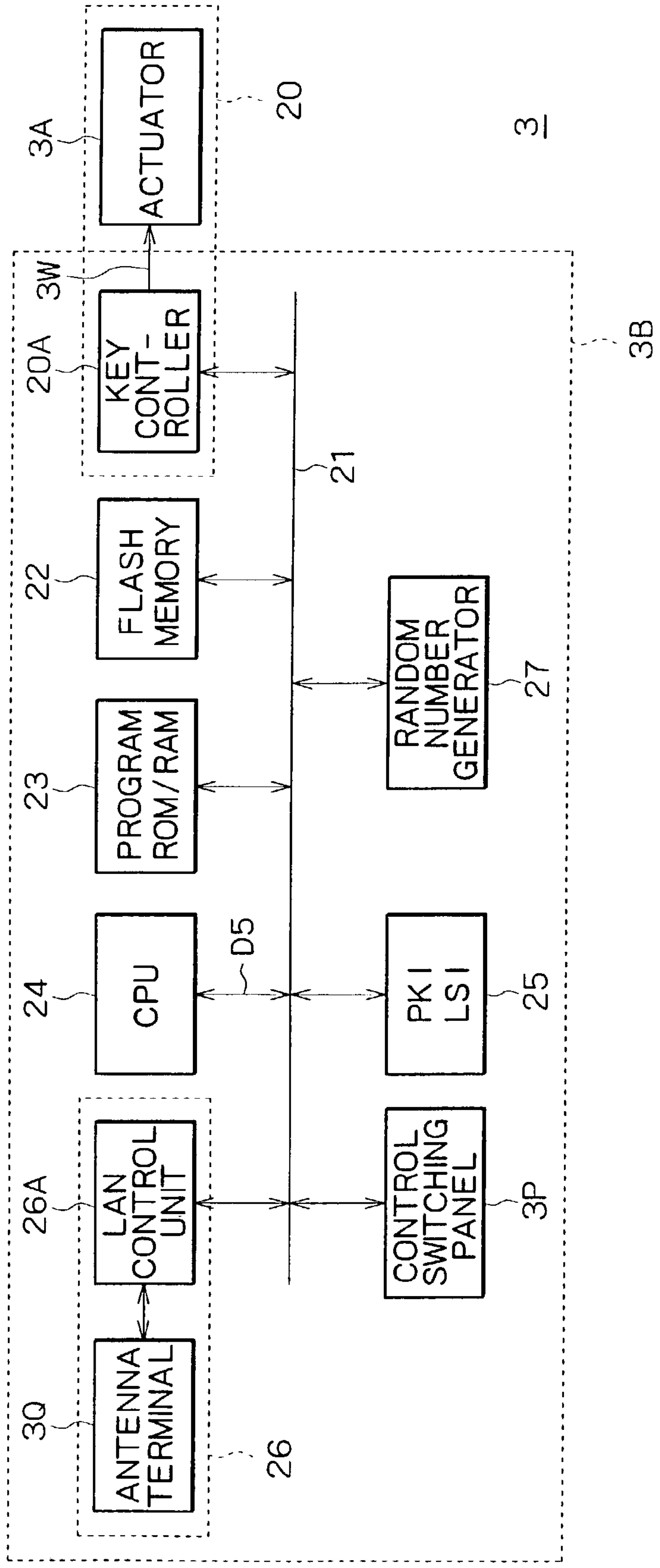
FIG. 5 is a block diagram showing details of configuration of a key control apparatus shown in FIG. 1.

FIG. 5 shows an internal configuration of the key control apparatus 3. The key control apparatus 3 includes: a key driving unit 20; a flash memory 22 connected to the key driving unit 20 via a bus 21; a program ROM and RAM 23; a CPU 24; a PKI LSI 25 connected to the CPU 24 via the bus 21; and a transmitting and receiving unit 26.

The key driving unit 20 is formed by connecting the actuator 3A for shutting and opening the electronic lock (not shown) attached to the door at the entrance to a key controller 20A for driving the actuator 3A via the wiring 3W.

In addition, the control switching panel 3P for a user to perform various input operations and a random number generator 27 for generating an appropriate random number as required are connected to the key control apparatus 3 via the bus 21.

In response to a data input from the electronic key 2 or an input operation of the control switching panel 3P, the CPU 24 reads a corresponding program among various programs stored within the flash memory 22, expands the program in the program ROM and RAM 23, and then performs various control processing according to the program.

Also, in response to a data input from the electronic key 2 or an input operation of the control switching panel 3P, the CPU 24 generates various cryptographic keys according to a cryptographic engine (program) stored in the flash memory 22 when necessary, as described later, and generates an appropriate random number by the random number generator 27.

The transmitting and receiving unit 26 includes: a LAN control unit 26A for exchanging various data by a wireless LAN method such for example as Bluetooth; and the antenna terminal 3Q for transmitting and receiving data sent to the LAN control unit 26A via the bus 21 under control of the CPU 24.

Figure 6:
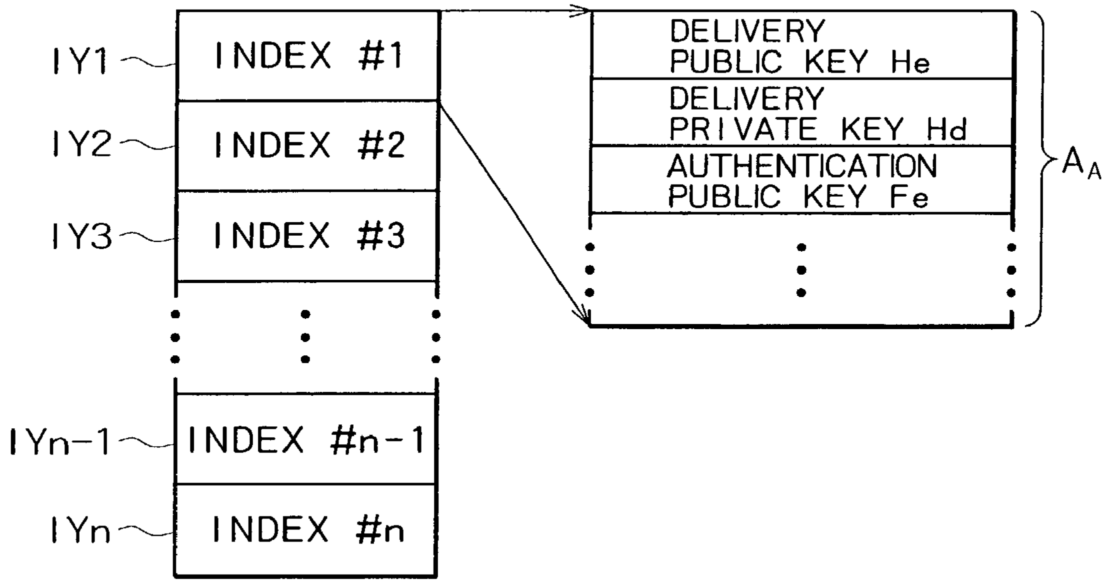
FIG. 6 is a conceptual diagram of assistance in explaining a data format of a flash memory of the key control apparatus.

FIG. 6 shows a data format of the flash memory 22. As shown in FIG. 6, each of indexes IY1 to IYn is provided for one fingerprint in the flash memory 22. Each of the indexes IY1 to IYn has an attribute area $A_A$. Various data (various public and private keys and the like to be described later) is stored in the attribute area $A_A$.

In response to a data input from the electronic key 2 side, the CPU 24 reads a corresponding program among the various programs stored within the flash memory 22, expands the program in the program ROM and RAM 23, and then performs various control processing according to the program.

Also, in response to a data input from the electronic key 2 side, the CPU 24 generates various cryptographic keys according to a cryptographic engine (program) stored in the flash memory 22 when necessary, as described later.

(2) Various Functions of Electronic Key 2

The electronic key 2 has a function of registering a fingerprint of a user, a function of comparing the fingerprint of the user with registered fingerprints, and a function of generating cryptographic keys for the user whose fingerprint is registered.

When a finger is pressed into contact with a sensor surface of the fingerprint identification sensor 2S in a state of no fingerprints being registered in the electronic key 2 at the time of new purchase or the like, the CPU 8 obtains a fingerprint of the finger, and then supplies resulting detection data D1 to the fingerprint identification LSI 4A. The fingerprint identification LSI 4A generates template data D3 from fingerprint data D2 based on the supplied detection data D1, and then stores the template data D3 in a template area $A_T$ in an index specified from the indexes IX1 to IXn of the flash memory 6. The fingerprint of a user is thus registered in the electronic key 2.

When a finger is pressed into contact with the sensor surface of the fingerprint identification sensor 2S of the electronic key 2, the CPU 8 obtains a fingerprint of the finger, and then supplies resulting detection data D1 to the fingerprint identification LSI 4A. The fingerprint identification LSI 4A sequentially compares fingerprint data D2 based on the supplied detection data D1 with template data D3 stored in the template areas $A_T$ of all the indexes IX1 to IXn of the flash memory 6, and then sends a result of the comparison to the CPU 8. The electronic key 2 thus compares the fingerprint of a user with registered fingerprints.

The electronic key 2 is configured to be able to create and register cryptographic keys for the user only once immediately after the user is authenticated as a registered user by the fingerprint comparison.

The electronic key 2 is configured so as to be able to create, as cryptographic keys, not only a pair of a private key Fd and a public key Fe for encrypting and decrypting a result of fingerprint authentication that is sent to the key control apparatus 3 side (the private key and the public key will hereinafter be referred to as an authentication private key and an authentication public key, respectively) but also a pair of a private key Hd and a public key He for delivering the authentication public key to a specific apparatus in secret (the private key and the public key will hereinafter be referred to as a delivery private key and a delivery public key, respectively), as described later, and register the keys.

In practice, when a finger is pressed into contact with the sensor surface of the fingerprint identification sensor 2S of the electronic key 2 and the fingerprint of the finger is authenticated as that of one of preregistered users, the CPU 8 allows an attribute area $A_A$ belonging to corresponding one of the indexes IX1 to Ixn, corresponding to the fingerprint in the flash memory 6, to be accessed only once.

The CPU 24 of the key control apparatus 3 determines whether the user is authenticated as a registered user on the basis of a result of authentication from the electronic key 2. When the user is not authenticated as a registered user, the CPU 24 ends this processing, while when the user is authenticated as a registered user, the CPU 24 issues a cryptographic key creating and registering command D5 to the CPU 8 of the electronic key 2.

When the cryptographic key creating and registering command D5 is supplied to the CPU 8 of the electronic key 2, the CPU 8 creates an authentication private key Fd and an authentication public key Fe by the cryptographic engine, and stores the authentication private key Fd and the authentication public key Fe in the attribute area $A_4$ belonging to the foregoing corresponding one of the indexes IX1 to IXn via the fingerprint identification LSI 4A.

The CPU 24 of the key control apparatus 3 can similarly create a delivery private key Hd and a delivery public key He, and similarly stores the created delivery private key Hd and delivery public key He in an attribute area $A_4$ belonging to corresponding one of the indexes IY1 to IYn in the flash memory 22.

Thus, with the electronic key 2, an authentication private key Fd and an authentication public key Fe and a delivery private key Hd and a delivery public key He are created for a user whose fingerprint is registered, and are stored in the flash memories 6 and 22 in such a manner as to correspond to the user.

In the case of the present embodiment, the CPU 24 of the key control apparatus 3 can freely read from the flash memory 22 the authentication public key Fe and the delivery public key He of the authentication private key Fd and the authentication public key Fe as well as the delivery private key Hd and the delivery public key He stored in the attribute area $A_4$ as described above, whereas the CPU 24 of the key control apparatus 3 cannot read from the flash memory 22 the authentication private key Fd and the delivery private key Hd.

Fundamental principles and use of public key cryptography will be described in the following. In public key cryptography, two keys referred to as a public key and a private key are created as cryptographic keys for encrypting information and decrypting the encrypted information. The public key and the private key have a relation in which information encrypted by one key can be decrypted only by the other key. The public key is disclosed to all people using the system (for example an electronic money system), and the private key is kept by an individual.

In such public key cryptography, each individual encrypts information using his/her private key, and sends resulting information to another person. The other person decrypts the information using a public key of the individual. When information is to be sent from the other person to the individual, the other person encrypts the information using the public key of the individual and sends resulting information to the individual. The individual decrypts the information using his/her private key.

Description will now be made by taking as an example a case where this cryptography is applied specifically to sale of an article. An orderer first encrypts an order slip by his/her private key and then sends the encrypted order slip to the seller. The seller decrypts the encrypted order slip sent thereto by a public key of the orderer. When the order slip is decrypted correctly, it is confirmed that the order slip that can be encrypted by only the orderer in principle has been sent, and therefore this proves that the order is really placed by the orderer.

The seller sends the ordered article to the orderer on the basis of the order slip and also sends a bill encrypted by the public key of the orderer to the orderer. The orderer decrypts the bill by his/her private key, and then pays the bill into an account of the seller or the like.

With such public key cryptography, only when information is encrypted by a private key of a person, the information can be decrypted by a public key of the person in principle. Therefore, such public key cryptography has an advantage of being able to prevent a crime of impersonating another person and a crime of denying having placed an order.

In addition, with the public key cryptography, information encrypted by a public key of a person can be decrypted only by a private key of the person in principle. Therefore, the public key cryptography has an advantage of being able to effectively and surely prevent a crime of changing the bill, the account into which to pay the bill or the like while the bill passes many points on the Internet, for example.

(3) Initial Setting in Authentication System

Figure 7:
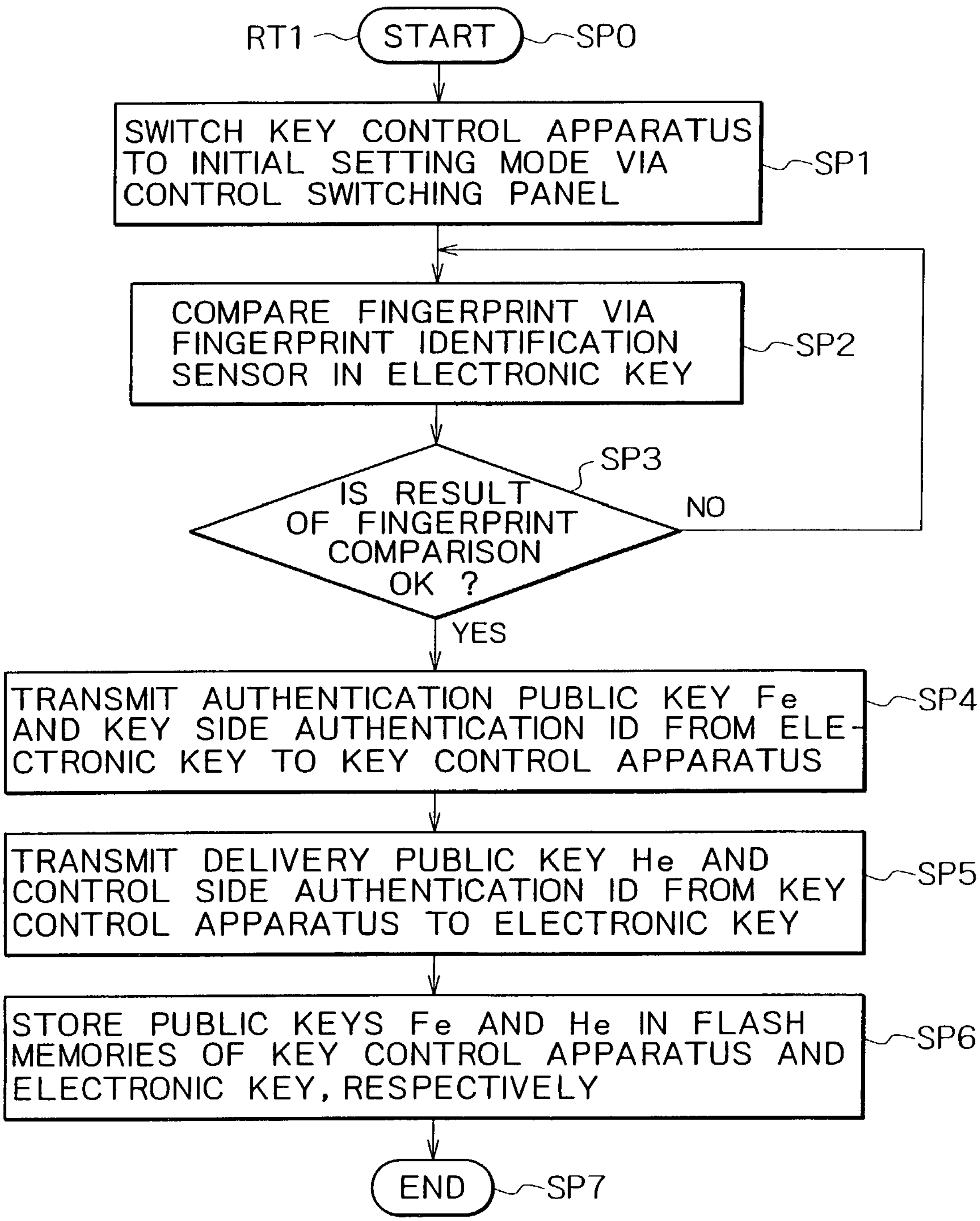
FIG. 7 is a flowchart of assistance in explaining an initial setting procedure.

In practice, the authentication system 1 starts an initial setting procedure RT1 shown in FIG. 7 at a step SP0. At a next step SP1, a user switches the key control apparatus 3 to an initial setting mode via the control switching panel 3P, whereby the CPU 24 within the key control apparatus 3 is set to the initial setting mode, that is, a state where command reception is possible.

At a next step SP2, the electronic key 2 compares a fingerprint of the user pressed into contact with the sensor surface of the fingerprint identification sensor 2S with preregistered fingerprints. When the electronic key 2 determines at a next step SP3 that a result of the comparison is OK, the processing proceeds to a step SP4, where the CPU 8 within the electronic key 2 reads an authentication public key Fe and a predetermined authentication ID (hereinafter referred to as a key side authentication ID) from the flash memory 6, and transmits the authentication public key Fe and the key side authentication ID to the key control apparatus 3.

At a step SP5, in the initial setting mode, when the key control apparatus 3 receives the authentication public key Fe and the key side authentication ID from the electronic key 2, the CPU 24 within the key control apparatus 3 reads a delivery public key He and a predetermined authentication ID (hereinafter referred to as a control side authentication ID) from the flash memory 22 in response to the reception of the authentication public key Fe and the key side authentication ID, and transmits the delivery public key He and the control side authentication ID to the electronic key 2.

At a step SP6, the public keys (authentication public key and delivery public key) Fe and He possessed by the electronic key 2 and the key control apparatus 3, respectively, and thus exchanged between the electronic key 2 and the key control apparatus 3 are stored in the flash memories 22 and 6, respectively. Thereby the procedure RT1 is ended.

(4) Operating State of Authentication System

Figure 8:
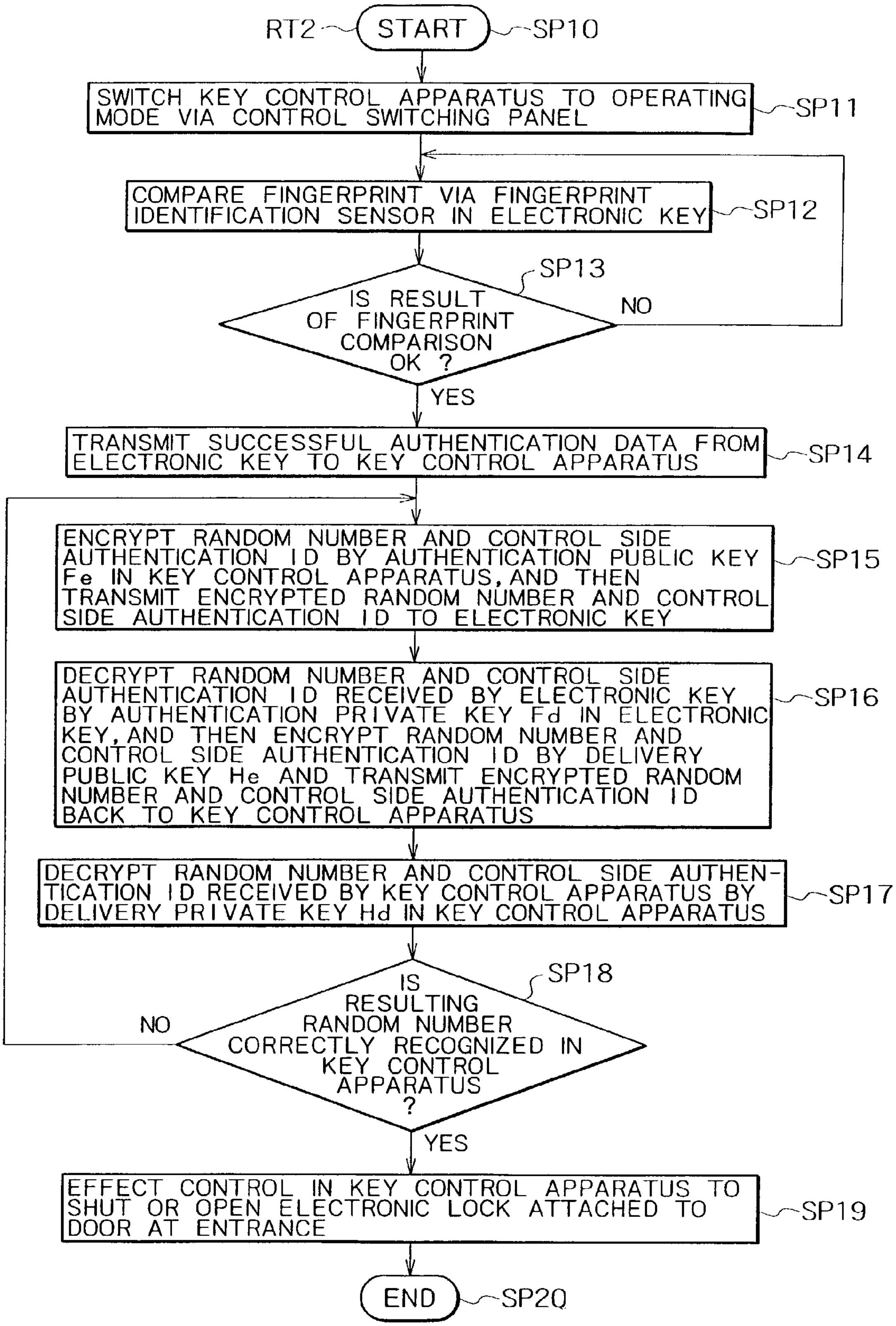
FIG. 8 is a flowchart of assistance in explaining an operation mode procedure.

Thereafter the authentication system 1 starts an operating mode procedure RT2 shown in FIG. 8 at a step SP10. At a next step SP11, the key control apparatus 3 switches from the foregoing initial setting mode to the normal operating mode via the control switching panel 3P, whereby the CPU 24 within the key control apparatus 3 resets its mode to an operation start state, that is, a state where command reception is possible.

At a next step SP12, the electronic key 2 compares a fingerprint of the user pressed into contact with the sensor surface of the fingerprint identification sensor 2S with preregistered fingerprints. When the electronic key 2 determines at a next step SP13 that a result of the comparison is OK, the processing proceeds to a step SP14, where the CPU 8 within the electronic key 2 transmits data (hereinafter referred to as successful authentication data) D6 indicating that a result of authentication of the user is OK to the key control apparatus 3 via the antenna terminal 2P of the transmitting and receiving unit 10.

At a next step SP15, when the successful authentication data D6 is received by the key control apparatus 3, the CPU 24 in the key control apparatus 3 controls the random number generator 27 to generate an appropriate random number (for example expressed as "RN"). Also, the CPU 24 reads the control side authentication ID (for example expressed as "ABC") from the flash memory 22. The CPU 24 encrypts the random number and the control side authentication ID by the authentication public key Fe of the electronic key 2 [("RN"+"ABC")$^{Fe}$], and then transmits the encrypted random number and control side authentication ID to the electronic key 2 via the antenna terminal 3Q of the transmitting and receiving unit 26.

At a step SP16, the CPU 8 in the electronic key 2 decrypts the random number and the control side authentication ID [("RN"+"ABC")$^{Fe}$] received by the electronic key 2 by an authentication private key Fd of the electronic key 2, and checks the control side authentication ID resulting from the decryption. In this case, when "ABC" is correctly recognized as the control side authentication ID, it means that the electronic key 2 has correctly received the delivery public key He of the key control apparatus 3.

Next, the CPU 8 within the electronic key 2 encrypts the decrypted random number and control side authentication ID by the delivery public key He of the key control apparatus 3 [("RN"+"ABC")$^{He}$], and then transmits the encrypted random number and control side authentication ID back to the key control apparatus 3 via the antenna terminal 2P of the transmitting and receiving unit 10.

Thus, at a step SP17, the CPU 24 in the key control apparatus 3 decrypts the random number and the control side authentication ID [("RN"+"ABC")$^{He}$] received by the key control apparatus 3 by a delivery private key Hd of the key control apparatus 3, and checks the random number resulting from the decryption.

In this case, when "RN" is correctly recognized as the random number at a step SP18, it means that operation of the electronic key 2 by the user already registered in the key control apparatus 3 has been confirmed.

In this case, the processing proceeds to a step SP19. At the step SP19, in response to such a result of authentication of the valid user, the CPU 24 within the key control apparatus 3 controls the key controller 20A of the key driving unit 20 and thus drives the actuator 3A to thereby shut or open the electronic lock (not shown) attached to the door at the entrance. The processing proceeds directly to a step SP20 to end the procedure RT2.

On the other hand, when "RN" is not recognized correctly as the random number at the step SP18, the processing returns to the step SP15 for the key control apparatus 3 to perform the same processing as described above. Incidentally, when the processing from the step SP15 to the step SP18 is repeated a predetermined number of times or more, or when a predetermined time has passed, the key control apparatus 3 displays an error message on the control switching panel 3P, and thereby informs the user operating the electronic key 2 of an error.

(5) Operation and Effects of First Embodiment

With the above configuration of the authentication system 1, the authentication public key Fe and the delivery public key He are exchanged between the electronic key 2 and the key control apparatus 3, and only when a result of fingerprint comparison by a user using the electronic key 2 indicates that the fingerprint of the user matches a fingerprint of a preregistered user, digital authentication by public key cryptography is performed between the electronic key 2 and the key control apparatus 3.

When the key control apparatus 3 confirms as a result of the digital authentication that the already registered user has operated the electronic key 2, the key control apparatus 3 shuts or opens the electronic lock attached to the door at the entrance, whereby only the preregistered user himself/herself can shut or open the electronic lock attached to the door at the entrance using the electronic key 2.

In addition, since the authentication system includes the fingerprint identification unit 4 on the side of the electronic key 2 rather than on the side of the key control apparatus 3, it is possible to avoid problems such as a failure of the fingerprint identification function as a result of an unrelated third party playing with the key control apparatus 3. Also, even when the key control apparatus 3 becomes dirty with dust, rain and the like in a state of being exposed to the air, the fingerprint identification function is hardly affected.

Furthermore, when a single electronic key 2 can be used to shut or open a plurality of locks, it is not necessary to include the fingerprint identification function in each of key control apparatus 3 for the locks. Accordingly, a plurality of authentication systems 1 can be constructed with simpler configuration.

With the above configuration of the authentication system 1, the fingerprint identification unit 4 is included on the side of the electronic key 2, fingerprint comparison is made by the user using the electronic key 2, and then digital authentication by public key cryptography is performed between the electronic key 2 and the key control apparatus 3. Therefore, only the preregistered user himself/herself can shut or open the electronic lock attached to the door at the entrance. It is thus possible to realize a usable authentication system 1 with a simple configuration.

Furthermore, since the control apparatus and the authentication device are provided separately from each other, the familiar authentication device can be used for any facilities, thus saving the user a trouble of obtaining a means for access to each facility. Also, human body characteristics do not need to be stored in the control apparatus that is installed in each facility and can be used in a public place, and the human body characteristics are stored in the authentication device physically isolated from the control apparatus. Therefore, safety against leakage of human body characteristics is dramatically improved. In addition, each control apparatus does not need to be provided with an expensive sensor, a device for storing human body characteristics, the authentication device and the like. Moreover, since the control apparatus and the authentication device communicate with each other at a short distance, a danger of interception by another device is reduced, which further improves safety.

[2] SECOND EMBODIMENT (1) Configuration of Authentication System According to Second Embodiment An authentication system according to a second embodiment is entirely of the same configuration as the foregoing authentication system 1 according to the first embodiment except that a flash memory 6 within an electronic key 2 and a flash memory 22 within a key control apparatus 3 have different data formats and that a random number generator (not shown) is provided within the electronic key 2.

As contrasted with the first embodiment, the authentication system according to the second embodiment has a plurality of key control apparatus 3 to be authenticated using a single electronic key 2.

A pair of a private key Cd and a public key Ce (hereinafter referred to as a common private key and a common public key, respectively) for encrypting and decrypting various data in a template unit is created in advance as cryptographic keys between the electronic key 2 and each of the key control apparatus 3. The common public key Ce is stored in the flash memory within the electronic key, while the common private key Cd is stored in the flash memory within the key control apparatus.

Figures 9A, 9B, 9C:
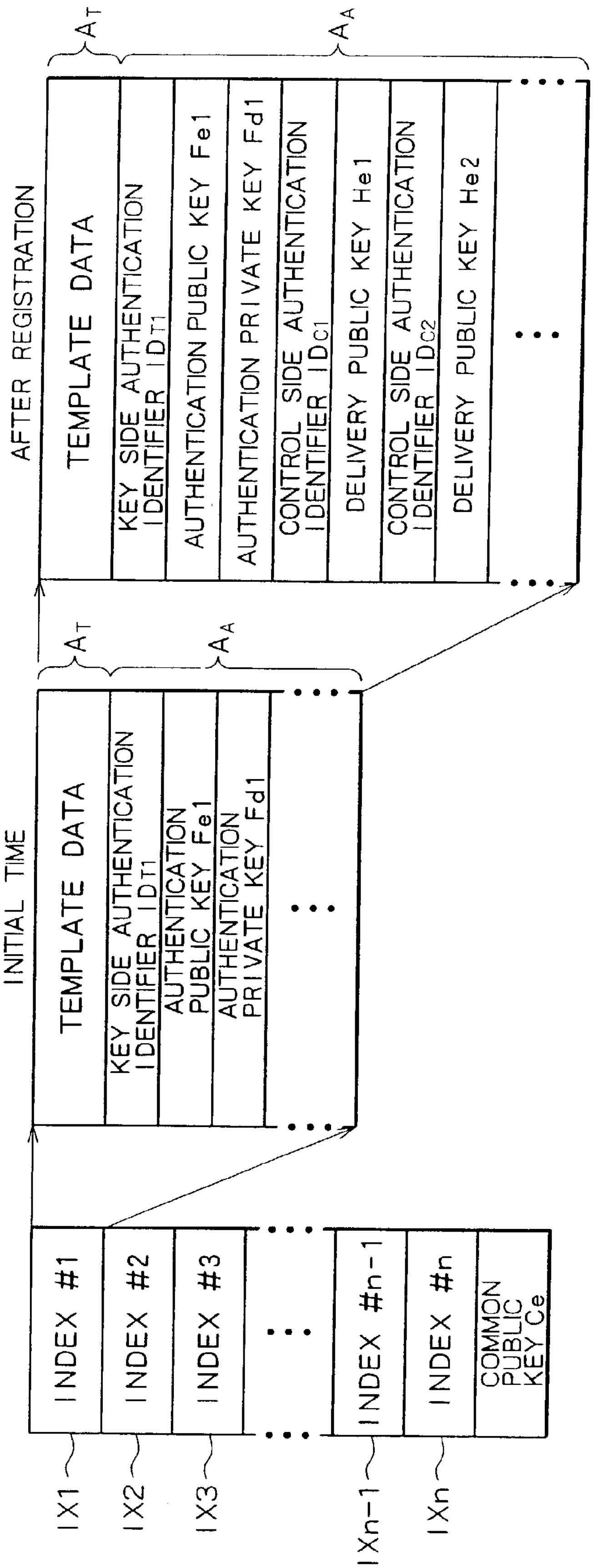
FIGS. 9A, 9B, and 9C are conceptual diagrams of assistance in explaining a data format of a flash memory of an electronic key.

As shown in FIGS. 9A to 9C, the data format of the flash memory 6 within the electronic key 2 has indexes IX1 to IXn corresponding to fingerprints and the common public key Ce registered for the electronic key itself (FIG. 9A).

Each of the indexes IX1 to IXn is divided into two areas: a template area $A_T$ and an attribute area $A_A$. Registered template data D3 is stored in the template area $A_T$, and at an initial time, a key side authentication identifier (that is, a key side authentication ID) $ID_{T1}$, an authentication public key Fe1 and an authentication private key Fd1 and the like associated with the template data D3 are stored in the attribute area $A_A$ (FIG. 9B)

Thereafter, as authentication is completed between the electronic key and the key control apparatus 3, the attribute area $A_A$ of each of the indexes IX1 to IXn sequentially stores a control side authentication identifier (that is, control side authentication ID) $ID_{C1}$, and a delivery public key He1, a control side authentication identifier $ID_{C2}$ and a delivery public key He2, and the like, in addition to the key side authentication identifier $ID_{T1}$, the authentication public key Fe1 and the authentication private key Fd1 and the like (FIG. 9C).

Figures 10A, 10B, 10C:
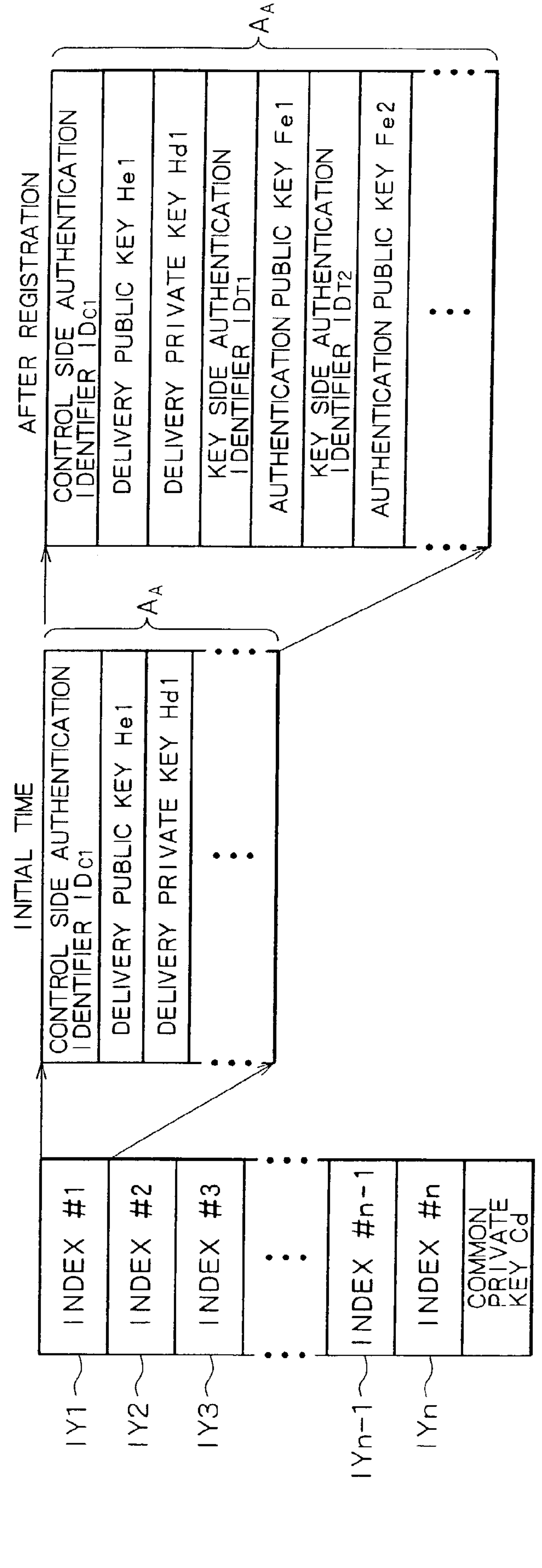
FIGS. 10A, 10B, and 10C are conceptual diagrams of assistance in explaining a data format of a flash memory of a key control apparatus.

As shown in FIGS. 10A to 10C, the data format of the flash memory 22 within the key control apparatus 3 has indexes IY1 to IYn corresponding to fingerprints and a common private key Cd registered for the key control apparatus itself (FIG. 10A).

Each of the indexes IY1 to IYn has an attribute area $A_A$. At an initial time, the control side authentication identifier $ID_{C1}$, the delivery public key He1 and a delivery private key Hd1 and the like are stored in the attribute area $A_A$ (FIG. 10B)

Thereafter, as authentication is completed between the key control apparatus 3 and the electronic key, the attribute area $A_A$ of each of the indexes IY1 to IYn sequentially stores the key side authentication identifier $ID_{T1}$ and the authentication public key Fe1, a key side authentication identifier $ID_{T2}$ and an authentication public key Fe2, and the like, in addition to the control side authentication identifier $ID_{C1}$, the delivery public key He1 and the delivery private key Hd1 and the like (FIG. 10C).

(2) Initial Setting in Authentication System

Figure 11:
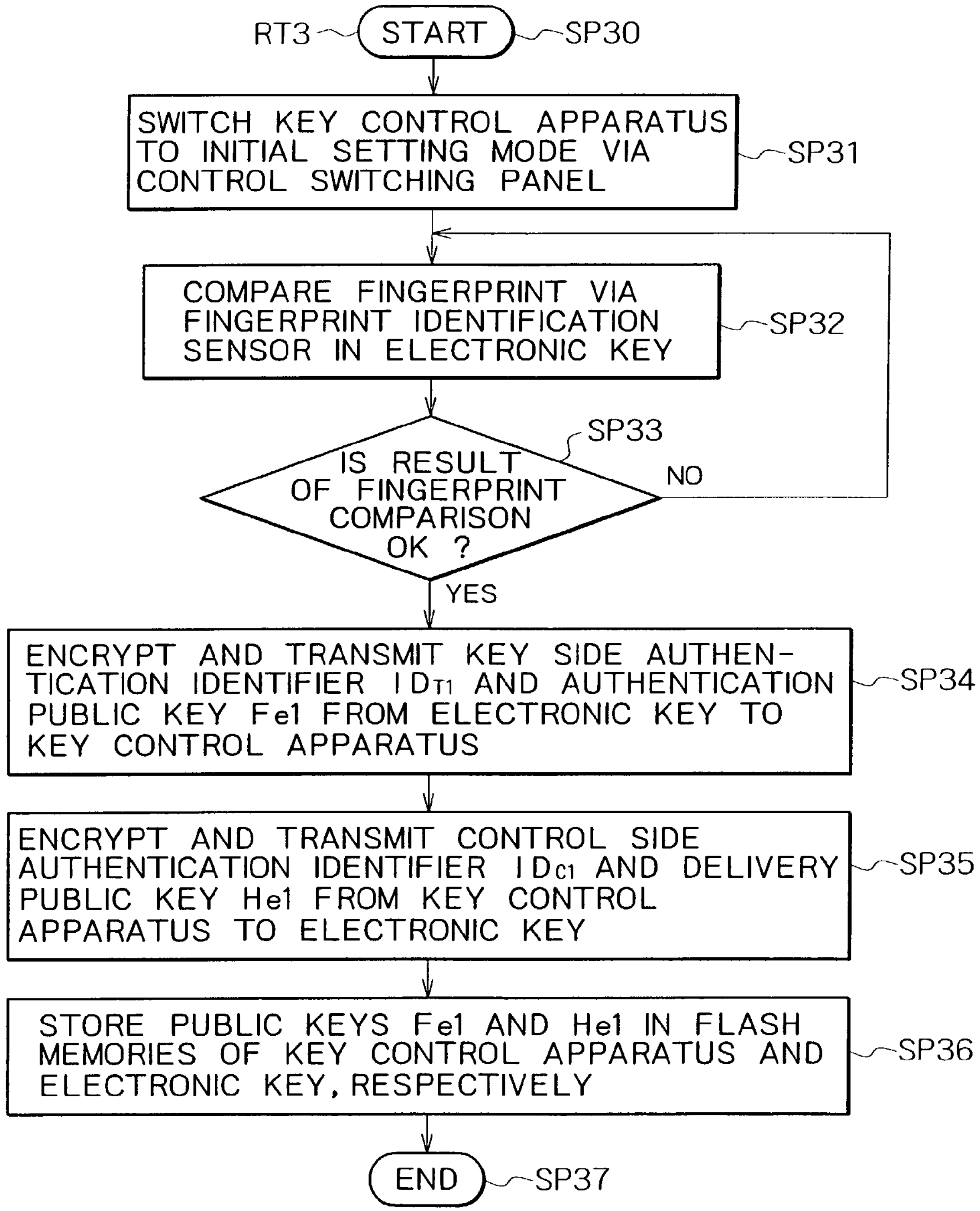
FIG. 11 is a flowchart of assistance in explaining an initial setting procedure.

In practice, the authentication system 1 starts an initial setting procedure RT3 shown in FIG. 11 at a step SP30. At a next step SP31, a user switches the key control apparatus 3 to an initial setting mode via a control switching panel 3P, whereby a CPU 24 within the key control apparatus 3 is set to the initial setting mode, that is, a state where command reception is possible.

At a next step SP32, the electronic key 2 compares a fingerprint of the user pressed into contact with the sensor surface of a fingerprint identification sensor 2S with preregistered fingerprints. When the electronic key 2 determines at a next step SP33 that a result of the comparison is OK, the processing proceeds to a step SP34.

Figure 12:
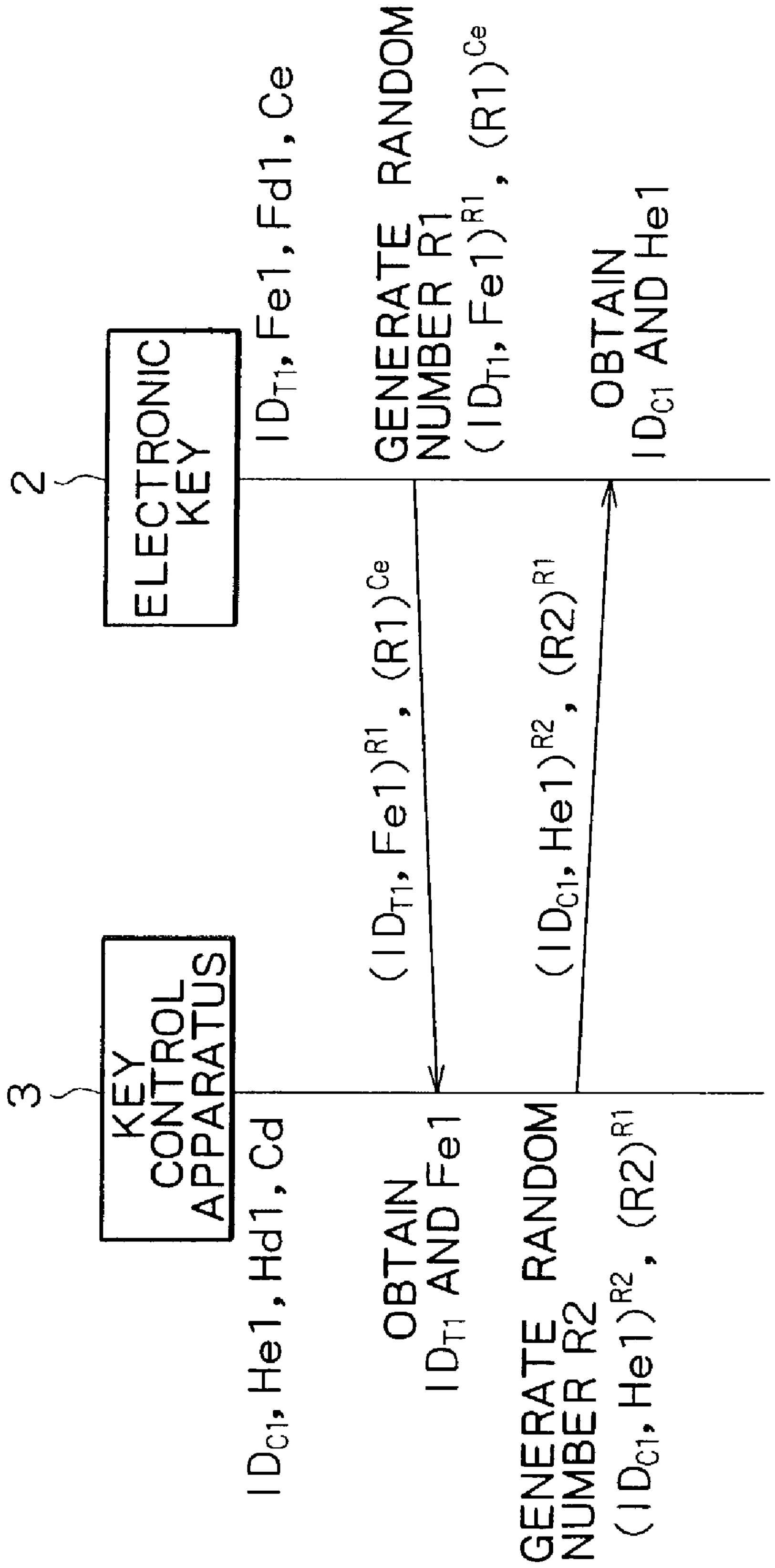
FIG. 12 is a timing chart of assistance in explaining data transmission and reception between the electronic key and the key control apparatus in initial setting mode.

At the step SP34, a CPU 8 within the electronic key 2 controls the random number generator (not shown) to generate an appropriate random number R1, and reads the key side authentication identifier $ID_{T1}$, the authentication public key Fe1, and the common public key Ce from the flash memory 6. In processing from the step SP34 to a step SP36 in the following, data is transmitted and received between the electronic key 2 and the key control apparatus 3 according to a timing chart of FIG. 12.

Then, the CPU 8 within the electronic key 2 encrypts the key side authentication identifier $ID_{T1}$ and the authentication public key Fe1 by the random number R1 $[(ID_{T1}, Fe1)^{R1}]$, and encrypts the random number R1 by the common public key Ce $[(R1)^{Ce}]$. The CPU 8 then transmits the encrypted key side authentication identifier $ID_{T1}$ and authentication public key Fe1 and the encrypted random number R1 to the key control apparatus 3 via an antenna terminal 2P of a transmitting and receiving unit 10.

The processing proceeds to a next step SP35. At the step SP35, in the initial setting mode, when the key control apparatus 3 receives the encrypted key side authentication identifier and authentication public key $[(ID_{T1}, Fe1)^{R1}]$ and the encrypted random number $[(R1)^{Ce}]$ from the electronic key 2, the CPU 24 within the key control apparatus 3 reads the common private key Cd from the flash memory 22 in response to the reception of the encrypted key side authentication identifier and authentication public key $[(ID_{T1}, Fe1)^{R1}]$ and the encrypted random number $[(R1)^{Ce}]$. The CPU 24 thereby decrypts the encrypted random number $[(R1)^{Ce}]$ to obtain the random number R1. The CPU 24 then decrypts the encrypted key side authentication identifier and authentication public key $[(ID_{T1}, Fe1)^{R1}]$ using the random number R1 to thereby obtain the key side authentication identifier $ID_{T1}$ and the authentication public key Fe1.

Then the CPU 24 within the key control apparatus 3 controls a random number generator 27 to generate an appropriate random number R2, and reads the control side authentication identifier $ID_{C1}$ and the delivery public key He1 from the flash memory 22.

Then, the CPU 24 within the key control apparatus 3 encrypts the control side authentication identifier $ID_{C1}$ and the delivery public key He1 by the random number R2 $[(ID_{C1}, He1)^{R2}]$, and encrypts the random number R2 by the received random number R1 $[(R2)^{R1}]$. The CPU 24 transmits the encrypted control side authentication identifier $ID_{C1}$ and delivery public key He1 and the encrypted random number R2 to the electronic key 2 via an antenna terminal 3Q of a transmitting and receiving unit 26.

At a step SP36, the public keys (authentication public key and delivery public key) Fe1 and He1 possessed by the electronic key 2 and the key control apparatus 3, respectively, and thus exchanged between the electronic key 2 and the key control apparatus 3 are stored in the flash memories 22 and 6, respectively. Thereby the procedure RT3 is ended.

As a result, since the public keys (authentication public key and delivery public key) Fe1 and He1 possessed by the electronic key 2 and the key control apparatus 3, respectively, are encrypted by public key cryptography using the common public key Ce and the common private key Cd provided in advance in the respective apparatus, and the public keys Fe1 and He1 are transmitted and received between the electronic key 2 and the key control apparatus 3, secrecy of communications (key side authentication identifier $ID_{T1}$ and control side authentication identifier $ID_{C1}$)

can be maintained, and the corresponding public keys can be securely transmitted between the apparatus while the apparatus authenticate each other.

(3) Operating State of Authentication System

Figure 13:
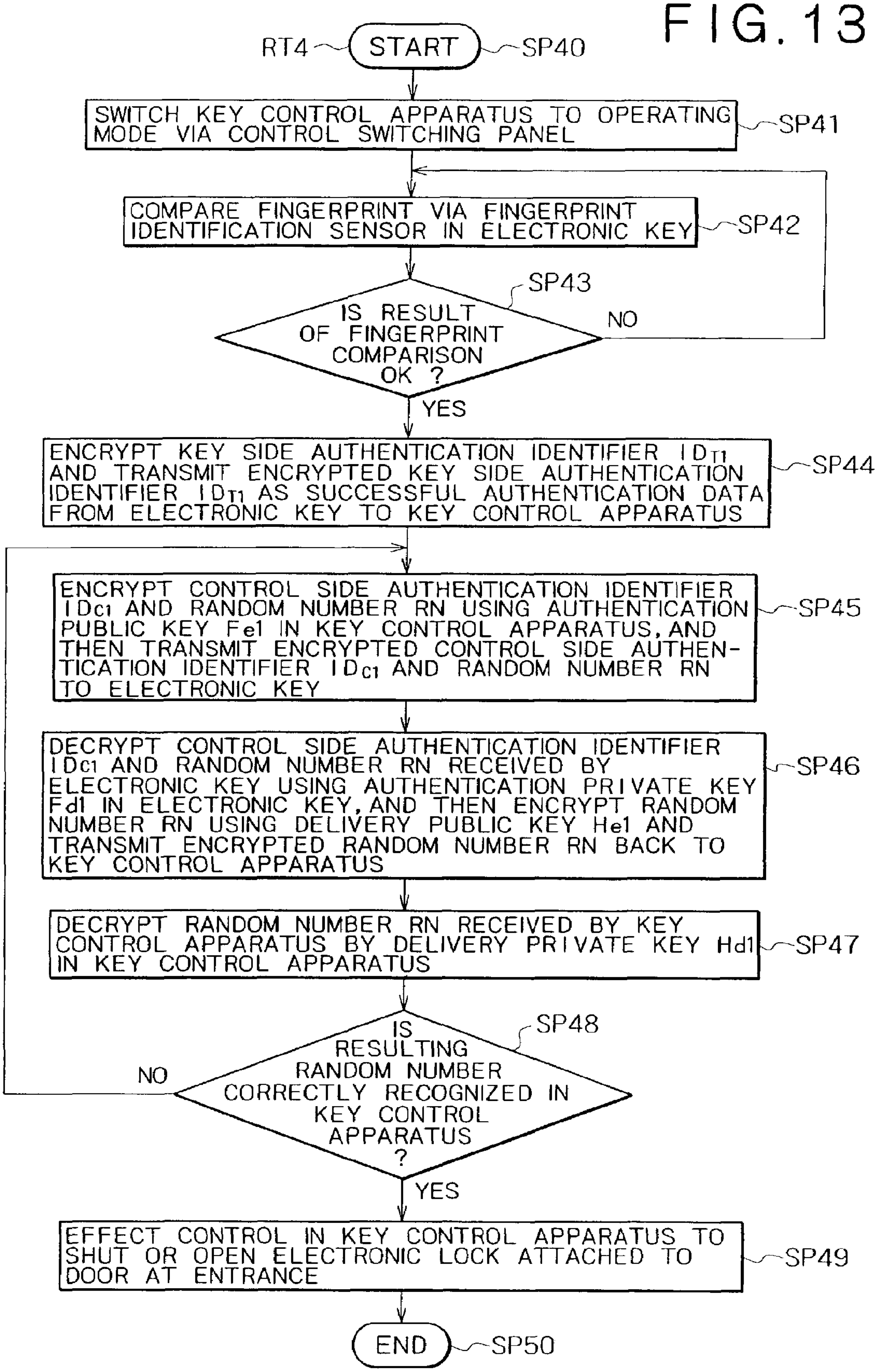
FIG. 13 is a flowchart of assistance in explaining an operation mode procedure.

Thereafter the authentication system 1 starts an operating mode procedure RT4 shown in FIG. 13 at a step SP40. At a next step SP41, the key control apparatus 3 switches from the foregoing initial setting mode to the normal operating mode via the control switching panel 3P, whereby the CPU 24 within the key control apparatus 3 resets its mode to an operation start state, that is, a state where command reception is possible.

At a next step SP42, the electronic key 2 compares a fingerprint of the user pressed into contact with the sensor surface of the fingerprint identification sensor 2S with preregistered fingerprints. When the electronic key 2 determines at a next step SP43 that a result of the comparison is OK, the processing proceeds to a step SP44.

Figure 14:
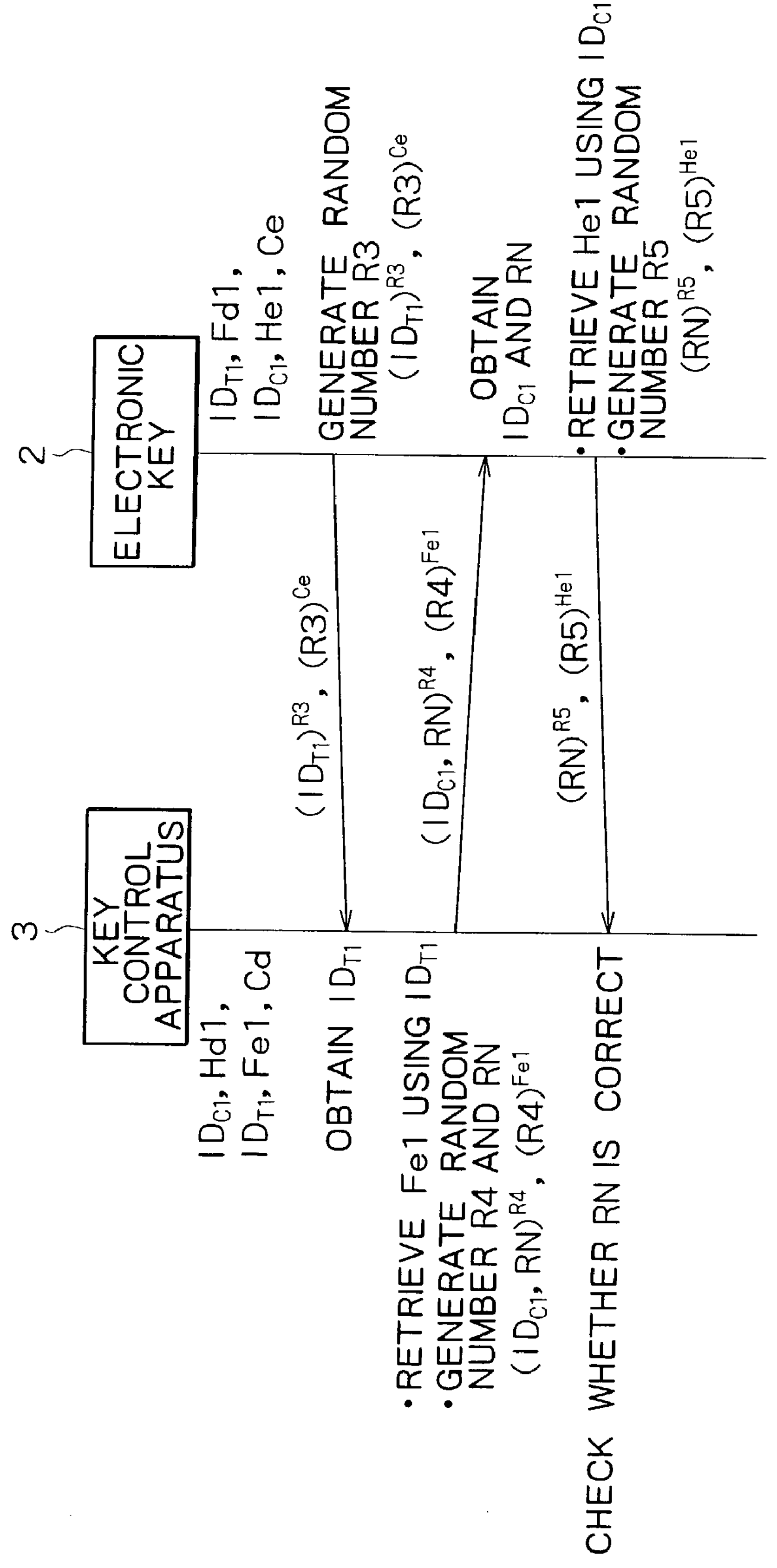
FIG. 14 is a timing chart of assistance in explaining data transmission and reception between the electronic key and the key control apparatus in operating mode.

At the step SP44, the CPU 8 within the electronic key 2 controls the random number generator (not shown) to generate an appropriate random number R3, and reads the key side authentication identifier $ID_{T1}$ and the common public key Ce from the flash memory 6. In processing from the step SP44 to a step SP47 in the following, data is transmitted and received between the electronic key 2 and the key control apparatus 3 according to a timing chart of FIG. 14.

Then, the CPU 8 within the electronic key 2 encrypts the key side authentication identifier $ID_{T1}$ by the random number R3 $[(ID_{T1})^{R3}]$, and encrypts the random number R3 by the common public key Ce $[(R3)^{Ce}]$. The CPU 8 then transmits the encrypted key side authentication identifier $ID_{T1}$ and the encrypted random number R3 as successful authentication data D6 mentioned above to the key control apparatus 3 via the antenna terminal 2P of the transmitting and receiving unit 10.

The processing proceeds to a next step SP45. At the step SP45, when the key control apparatus 3 receives the encrypted key side authentication identifier $[(ID_{T1})^{R3}]$ and the encrypted random number $[(R3)^{Ce}]$ from the electronic key 2, the CPU 24 within the key control apparatus 3 reads the common private key Cd from the flash memory 22 in response to the reception of the encrypted key side authentication identifier $[(ID_{T1})^{R3}]$ and the encrypted random number $[(R3)^{Ce}]$. The CPU 24 thereby decrypts the encrypted random number $[(R3)^{Ce}]$ to obtain the random number R3. The CPU 24 then decrypts the encrypted key side authentication identifier $[(ID_{T1})^{R3}]$ using the random number R3 to thereby obtain the key side authentication identifier $ID_{T1}$.

Then the CPU 24 within the key control apparatus 3 controls the random number generator 27 to generate appropriate random numbers R4 and RN, and reads the control side authentication identifier $ID_{C1}$ and the authentication public key Fe1 corresponding to the control side authentication identifier $ID_{C1}$ from the flash memory 22.

Then, the CPU 24 within the key control apparatus 3 encrypts the control side authentication identifier $ID_{C1}$, and the random number RN by the random number R4 $[(ID_{C1}, RN)^{R4}]$, and encrypts the random number R4 by the authentication public key Fe1 $[(R4)^{Fe1}]$. The CPU 24 transmits the encrypted control side authentication identifier $ID_{C1}$ and random number RN and the encrypted random number R4 to the electronic key 2 via the antenna terminal 3Q of the transmitting and receiving unit 26.

At a step SP46, when the electronic key 2 receives the encrypted control side authentication identifier and random number $[(ID_{C1}, RN)^{R4}]$ and the encrypted random number $[(R4)^{Fe1}]$ from the key control apparatus 3, the CPU 8 within the electronic key 2 reads the authentication private key Fd1 of the electronic key 2 from the flash memory 6 in response to the reception of the encrypted control side authentication identifier and random number $[(ID_{C1}, RN)^{R4}]$ and the encrypted random number $[(R4)^{Fe1}]$. The CPU 8 thereby decrypts the encrypted random number $[(R4)^{Fe1}]$ to obtain the random number R4. The CPU 8 then decrypts the encrypted control side authentication identifier and random number $[(ID_{C1}, RN)^{R4}]$ using the random number R4 to thereby obtain the control side authentication identifier $ID_{C1}$ and the random number RN.

Then the CPU 8 within the electronic key 2 controls the random number generator (not shown) to generate an appropriate random number R5, and reads the delivery public key He1 corresponding to the control side authentication identifier $ID_{C1}$ from the flash memory 6.

Then, the CPU 8 within the electronic key 2 encrypts the random number RN by the random number R5 $[(RN)^{R5}]$, and encrypts the random number R5 by the delivery public key He1 $[(R5)^{He1}]$. The CPU 8 transmits the encrypted random number RN and the encrypted random number R5 to the key control apparatus 3 via the antenna terminal 2P of the transmitting and receiving unit 10.

At a step SP47, when the key control apparatus 3 receives the thus encrypted random numbers $[(RN)^{R5}]$ and $[(R5)^{He1}]$ from the electronic key 2, the CPU 24 within the key control apparatus 3 decrypts the random numbers $[(RN)^{R5}]$ and $[(R5)^{He1}]$ using the delivery private key Hd1 of the key control apparatus 3, and then checks the random number obtained as a result of the decryption.

In this case, when "RN" is correctly recognized as the random number at a step SP48, it means that operation of the electronic key 2 by the user already registered in the key control apparatus 3 has been confirmed.

In this case, the processing proceeds to a step SP49. At the step SP49, in response to such a result of authentication of the valid user, the CPU 24 within the key control apparatus 3 controls a key controller 20A of a key driving unit 20 and thus drives an actuator 3A to thereby shut or open an electronic lock (not shown) attached to a door at an entrance. The processing proceeds directly to a step SP50 to end the procedure RT4.

On the other hand, when "RN" is not recognized correctly as the random number at the step SP48, the processing returns to the step SP45 for the key control apparatus 3 to perform the same processing as described above. Incidentally, when the processing from the step SP45 to the step SP48 is repeated a predetermined number of times or more, or when a predetermined time has passed, the key control apparatus 3 displays an error message on the control switching panel 3P, and thereby informs the user operating the electronic key 2 of an error.

(4) Operation and Effects of Second Embodiment

With the above configuration of the authentication system 1, the authentication public key Fe and the delivery public key He are exchanged between the electronic key 2 and the key control apparatus 3 while encrypted by public key cryptography, and only when a result of fingerprint comparison by a user using the electronic key 2 indicates that the fingerprint of the user matches a fingerprint of a preregistered user, digital authentication by public key cryptography is performed between the electronic key 2 and the key control apparatus 3.

When the key control apparatus 3 confirms as a result of the digital authentication that the already registered user has operated the electronic key 2, the key control apparatus 3 shuts or opens the electronic lock attached to the door at the entrance, whereby only the preregistered user himself/herself can shut or open the electronic lock attached to the door at the entrance using the electronic key 2.

In addition, since the authentication system includes the fingerprint identification unit 4 on the side of the electronic key 2 rather than on the side of the key control apparatus 3, it is possible to avoid problems such as a failure of the fingerprint identification function as a result of an unrelated third party playing with the key control apparatus 3. Also, even when the key control apparatus 3 becomes dirty with dust, rain and the like in a state of being exposed to the air, it is possible to effectively prevent the fingerprint identification function from being adversely affected.

Furthermore, since a control side authentication identifier $ID_{Cn}$ and a delivery public key Hen (n is a natural number) for a key control apparatus that are obtained as a result of authentication as described above are sequentially registered in the flash memory 6 within the electronic key 2, the single electronic key 2 can be shared by a plurality of key control apparatus. As a result, it is not necessary to include the fingerprint identification function in each of the key control apparatus 3. Accordingly, a plurality of authentication systems 1 can be constructed with a simpler configuration.

Furthermore, since a key side authentication identifier $ID_{Tm}$ and an authentication public key Fem (m is a natural number) for an electronic key that are obtained as a result of authentication as described above are sequentially registered in the flash memory 22 within the key control apparatus 3, the single key control apparatus can be controlled by a plurality of electronic keys 2. As a result, even an electronic key handled by another key control apparatus can be used as required. Accordingly, a more various authentication system 1 can be constructed.

With the above configuration of the authentication system 1, the fingerprint identification unit 4 is included on the side of the electronic key 2, fingerprint comparison is made by the user using the electronic key 2, and then digital authentication by public key cryptography is performed between the electronic key 2 and the key control apparatus 3. Therefore, only the preregistered user himself/herself can shut or open the electronic lock attached to the door at the entrance. It is thus possible to realize a usable authentication system 1 with a simple configuration.

Furthermore, in order that a single electronic key 2 controls a plurality of key control apparatus 3 or a single key control apparatus 3 is controlled by a plurality of electronic keys 2, setting can be made freely to allow authentication according to selection of the controller. Thus, a various authentication system 1 can be constructed.

[3] OTHER EMBODIMENTS

It is to be noted that while the foregoing first and second embodiments have been described by taking a case where the present invention is applied to the authentication system 1 comprising the electronic key (authentication communication device) 2 and the key control apparatus (control apparatus) 3 formed as shown in FIG. 1, the present invention is not limited to this and is widely applicable to communication systems of various other configurations according to other embodiments.

Also, the foregoing first and second embodiments have dealt with a case where the authentication system 1 is constructed by applying the electronic key 2 of a simple, portable type as shown in FIG. 2 and FIG. 3 as an electronic key (authentication communication device) 2 of a portable type that authenticates a user on the basis of human body characteristics of the user and then outputs successful authentication data (authentication signal) D6 only when a positive result is obtained, and by applying the key control apparatus 3 as shown in FIG. 5 for shutting or opening the electronic lock attached to the door at the entrance as a control apparatus that performs predetermined control processing on the basis of the authentication signal received from the authentication communication device. However, the present invention is not limited to this, and is widely applicable to various other authentication communication devices and control apparatus that require user authentication to shut and open a door of an office, a vehicle or the like, to make an entry on a time recorder, to start an engine of a vehicle, for example. The control processing of a control apparatus in such a case may be set or constructed freely according to a manner in which the communication system is used.

In addition, the present invention may be widely applied to a case where a locking system for locking a door of a house unlocks the door on the basis of a result of fingerprint comparison, a case where a system for stock trading via a television broadcast capable of two-way communication or the Internet confirms stock trading on the basis of a result of fingerprint comparison, a case where a control system of a private car not only unlocks doors of the car but also starts an engine of the car on the basis of a result of fingerprint comparison, a case where a connection of a terminal apparatus such as a notebook computer to a company LAN is permitted on the basis of a result of fingerprint comparison, a case where a company time recorder records a time of reporting to work on the basis of a result of fingerprint comparison, a case where starting of a company computer is permitted on the basis of a result of fingerprint comparison, a case where a system for sorting out or approving documents approves documents on the basis of a result of fingerprint comparison, a case where in shopping using a credit card, payment is made on the basis of a result of fingerprint comparison, a case where a system for making a reservation for entertainment such as a concert takes a reservation on the basis of a result of fingerprint comparison, and the like.

Furthermore, the electronic key 2 as a portable type authentication communication device may be included in a mobile device such as a portable telephone or a wristwatch. The electronic key 2 may also be a module having a general interface and capable of being mounted on various devices such for example as a memory stick. The electronic key 2 may also be included in an IC card or a wristwatch, or in a telephone card, a credit card, a cash card, a card used for an ATM of a bank, a ticket (commutation ticket) used at various public transportation systems, a passport, a driver's license, an insurance policy or the like.

In addition, in the foregoing first and second embodiments, description has been made of the portable type electronic key (authentication communication device) 2 including the fingerprint identification unit (authentication means) 4 for authenticating a user on the basis of human body characteristics of the user and the transmitting and receiving unit (output means) 10 for outputting successful authentication data (authentication signal) D6 only when a result of the authentication by the fingerprint identification unit 4 is positive. However, the present invention is not limited to this, and is widely applicable to authentication communication devices of various other configurations.

In such a case, while the fingerprint identification unit 4 for comparing a fingerprint of a finger of a user with preregistered fingerprints is used as the authentication means for authenticating the user on the basis of human body characteristics of the user, the present invention is widely applicable to devices of various configurations for making various other biometric identifications. Human body characteristics of a user used in such cases include the fingerprint, a voice print, a pattern of the retina, a pattern of the iris, hand size, speed or stroke pressure of a pen when the user signs, and the like.

Moreover, in the foregoing first and second embodiments, description has been made of the key control apparatus (control apparatus) 3 for communicating at a short distance with the electronic key (authentication communication device) 2 for outputting an authentication signal on the basis of human body characteristics, the key control apparatus (control apparatus) 3 including: the transmitting and receiving unit (receiving means) 26 for receiving the authentication signal from the electronic key 2; the CPU (communication device authenticating means) 24 for performing communication device authenticating processing for authenticating the electronic key 2; and the key driving unit (processing means) 20 for performing predetermined processing when a positive result is obtained from the CPU 24. However, the present invention is not limited to this, and is widely applicable to control apparatus of various other configurations.

Furthermore, in the foregoing first and second embodiments, description has been made of a case where various data is exchanged between the electronic key (authentication communication device) 2 and the key control apparatus (control apparatus) 3 using the transmitting and receiving units (output means) 10 and 26 by a wireless LAN method such for example as Bluetooth. However, the present invention is not limited to this. As long as various data can be exchanged between the portable type authentication communication means and the control means on a wireless basis, the communication may be made by various wireless methods such for example as IEEE 802.11a, b, or g and UWB (Ultra Wide Band). In addition, the short-distance communication may be made by a wire connection such as USB (Universal Serial Bus) or the like.

Furthermore, in the foregoing first and second embodiments, description has been made of a case where the CPUs (information processing means) 8 and 24 perform digital authentication between the electronic key 2 and the key control apparatus 3 by public key cryptography using the authentication private key (first private key) Fd and the authentication public key (first public key) Fe created by the electronic key 2 and the delivery private key (second private key) Hd and the delivery public key (second public key) He created by the key control apparatus 3. However, the present invention is not limited to this, and is widely applicable to digital authentication using other cryptosystems.

In such a case, with respect to encryption used in the digital authentication, the description of $(M)^R$ representing encryption of data M by a random number R may include encryption by not only a single random number R but also a plurality of random numbers R. With respect to the encryption algorithm, the present invention may be widely applied to arbitrary algorithms such as Triple DES (Data Encryption Standard), IDEA (International Data Encryption Algorithm), BLOWFISH, RC5 (Ron's Code/Rivest's Cipher 5), CAST-128 and the like.

As described above, the communication system according to the present invention includes: the authentication communication device of a portable type for performing authentication processing on the basis of human body characteristics of a user and outputting a predetermined authentication signal to an exterior thereof only when a positive result is obtained; and the control apparatus disposed separately from the authentication communication device for receiving the authentication signal outputted from the authentication communication device and performing predetermined control processing on the basis of the authentication signal. Therefore, on the basis of a result of authentication by the authentication communication device, only a user preregistered in the control apparatus makes it possible to perform the predetermined control processing. It is thus possible to realize a usable communication system with a simple configuration.

According to the present invention, the authentication communication device of the portable type includes: the authentication means for performing authentication processing on the basis of human body characteristics of the user; and the output means for outputting the predetermined authentication signal to an exterior thereof only when a positive result is obtained from the authentication means. Therefore, on the basis of a result of the user authentication, only a preregistered user makes it possible for the apparatus that the authentication communication device communicates with to perform the predetermined control processing. It is thus possible to realize a usable authentication communication device with a simple configuration.

In addition, according to the present invention, the control apparatus, for communicating at a short distance with the authentication communication device for outputting an authentication signal on the basis of human body characteristics, includes: the receiving means for receiving the authentication signal from the authentication communication device; the communication device authenticating means for performing communication device authenticating processing for authenticating the authentication communication device; and the processing means for performing predetermined processing when a positive result is obtained from the communication device authenticating means. Therefore, on the basis of a result of authentication by the authentication communication device, only a preregistered user makes it possible to perform the predetermined control processing. It is thus possible to realize a usable authentication communication device with a simple configuration.

Furthermore, the communication method according to the present invention performs authentication processing on the basis of human body characteristics of a user, and then outputs a predetermined authentication signal to an exterior only when a positive result is obtained as a result of the authentication. Therefore, on the basis of a result of the user authentication, only a preregistered user makes it possible for an apparatus that the communication is made with to perform predetermined control processing. It is thus possible to realize a usable communication method with a simple composition.

What is claimed is:

1. A communication system comprising an authentication communication device of a portable type for performing authentication processing on the basis of human body characteristics of a user and outputting a predetermined authentication signal to an exterior thereof only when a positive result is obtained; and a control apparatus disposed separately from said authentication communication device for receiving said authentication signal outputted from said authentication communication device and performing predetermined control processing on the basis of said authentication signal wherein said authentication communication device creates a first public key and a first private key by public key cryptography and then supplies said first public key to said control apparatus, while said control apparatus creates a second public key and a second private key by said public key cryptography and then supplies said second public key to said authentication communication device:

said control apparatus encrypts predetermined information by said first public key on the basis of said authentication signal received from said authentication communication device, and then transmits the information to said authentication communication device;

said authentication communication device decrypts the information encrypted by said first public key by said first private key, and then encrypts the information by said second public key and transmits the information to said control apparatus; and said control apparatus performs said control processing on the basis of the information encrypted by said second public key.

2. An authentication communication device of a portable type comprising:

authentication means for performing authentication processing on the basis of human body characteristics of a user;

output means for outputting a predetermined authentication signal to an exterior thereof only when a positive result is obtained from said authentication means; and information processing means for creating a first public key and a first private key by public key cryptography and then supplying said first public key to an external apparatus to communicate with and when said apparatus to communicate with encrypts predetermined information by said first public key on the basis of said authentication signal received from said output means and then transmits the information back to said authentication communication device, decrypting the information encrypted by said first public key by said first private key, and then encrypting the information by a second public key created by said public key cryptography by said apparatus to communicate with and transmitting the information to said apparatus to communicate with.

3. An authentication communication device as claimed in claim 2, wherein said output means produces the output for short-distance communication.

4. A control apparatus for communicating at a short distance with an authentication communication device for outputting an authentication signal on the basis of human body characteristics, said control apparatus comprising:

receiving means for receiving said authentication signal from said authentication communication device;

communication device authenticating means for performing communication device authenticating processing for authenticating said authentication communication device; and processing means for performing predetermined processing when a positive result is obtained from said communication device authenticating means, wherein said communication device authenticating means includes:

authentication transmitting means for transmitting a first information signal resulting from a first encryption to said authentication communication device; and authentication receiving means for receiving second information resulting from a second encryption by said authentication communication device; and said communication device authenticating means performs said authenticating processing on the basis of said first information and said second information.

5. A communication method comprising:

a first step for performing authentication processing on the basis of human body characteristics of a user;

a second step for outputting a predetermined authentication signal to an exterior only when a positive result is obtained as a result of said authentication; and a third step for creating a first public key and a first private key by public key cryptography and then supplying said first public key to an external apparatus to communicate with, and when said apparatus to communicate with encrypts predeteRMined information by said first public key on the basis of said authentication signal received from output means and then sends back the information, decrypting the information encrypted by said first public key by said first private key, and then encrypting the information by a second public key created by said public key cryptography by said apparatus to communicate with and transmitting the information to said apparatus to communicate with.

* * * * *